United States Patent [19]

Lutz

[11] Patent Number: 4,900,346
[45] Date of Patent: Feb. 13, 1990

[54] PORTABLE AIR FILTRATION DEVICE

[76] Inventor: Thomas G. Lutz, 23723 E. 1st Ave., Liberty Lake, Wash. 99019

[21] Appl. No.: 325,858

[22] Filed: Mar. 20, 1989

[51] Int. Cl.⁴ .............................................. B01D 53/04
[52] U.S. Cl. ..................................... 55/387; 55/316; 55/385.2; 55/471; 55/472; 55/494; 55/516
[58] Field of Search ................ 55/316, 337, 385.1, 55/385.2, 385.4, 387, 471, 472, 492, 494, 516

[56] References Cited

U.S. PATENT DOCUMENTS

| 2,557,432 | 6/1951 | Holstedt | 55/387 X |
| 2,764,251 | 9/1956 | Jessop | 55/316 |
| 3,080,695 | 3/1963 | Hay | 55/471 X |
| 3,654,747 | 4/1972 | Remick | 55/316 X |
| 4,252,547 | 2/1981 | Johnson | 55/316 X |
| 4,514,197 | 4/1985 | Armbruster | 55/316 |
| 4,526,592 | 7/1985 | Armbruster | 55/316 X |

Primary Examiner—Charles Hart
Attorney, Agent, or Firm—Keith S. Bergman

[57] ABSTRACT

A portable filter device provides a substantial mass of particulated charcoal distributed in a horizontally orientated lenticular configuration across a horizontal orifice to provide substantially uniform filtration properties over the orifice area. The filter device is releasably assemblable to allow change of particulated charcoal for replacement or modification and optionally to provide for use of a second supplementally associated mechanical filter. A casement defines an internal plenum that carries a squirrel-cage type fan that draws air through the filter, acts as an equalizing reservoir, and provides space for optional sorbefacient materials.

1 Claim, 1 Drawing Sheet

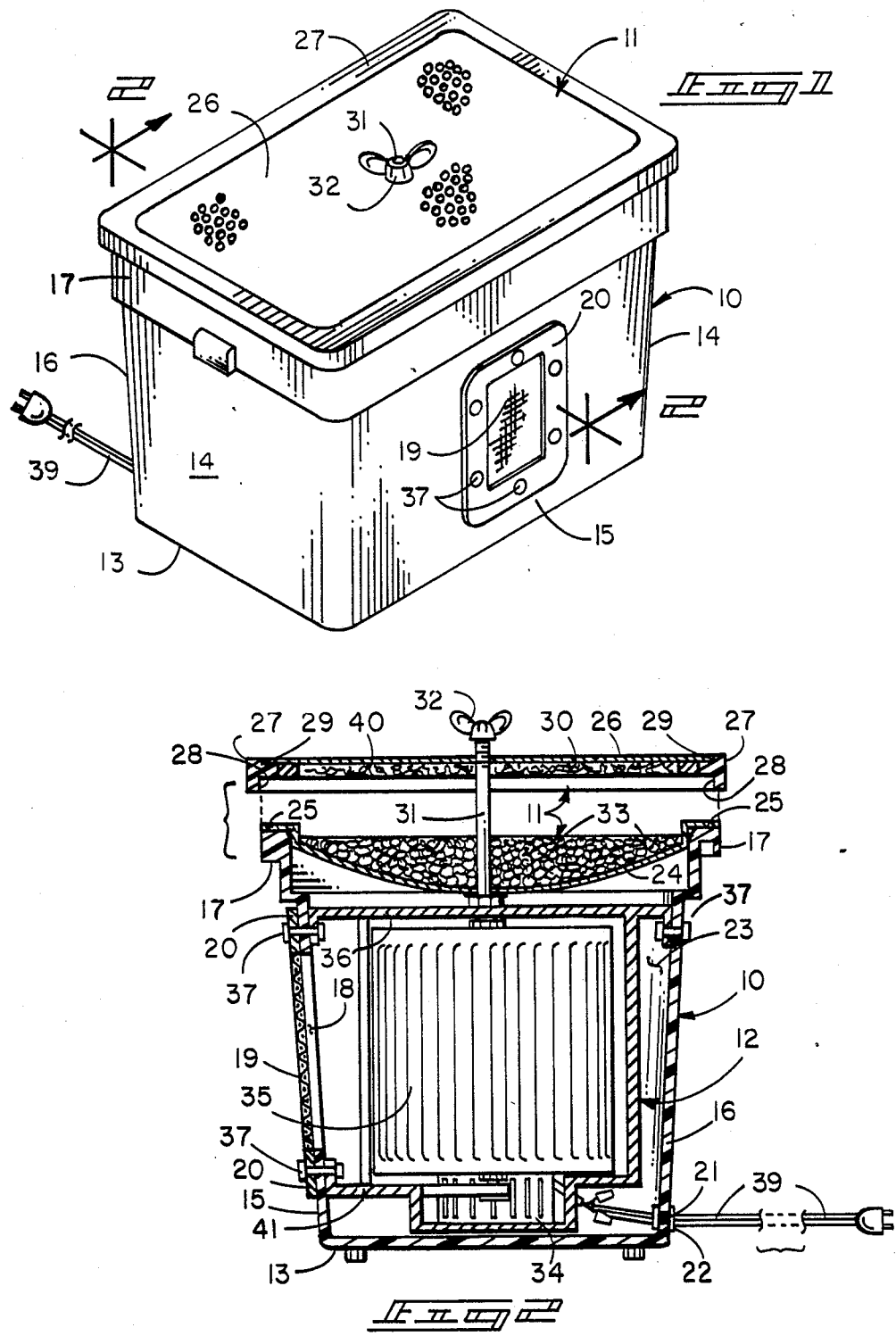

PORTABLE AIR FILTRATION DEVICE

BACKGROUND OF THE INVENTION

1. Related Applications

There are no applications related hereto heretofore filed in this or any foreign country.

2. Field of Invention

My invention relates generally to portable air filtration devices, and more particularly to such a filter device that has a relatively large, replaceable mass of particulated charcoal disposed in lenticular configuration in a horizontal filtering orifice, with optionally associated secondary filtration means.

BACKGROUND AND DESCRIPTION OF PRIOR ART

The filtration of air in enclosed areas for various culturally timely purposes has long been accomplished and through its history has grown substantially in efficiency and sophistication. Initially, air filters were primarily of a stationary mechanical type adapted primarily for particulate removal, but as the field has developed, filters have become both portable and of various sorbefacient types which can remove gaseous components from filtered air, with or without secondary mechanical filtration. My invention provides a new, novel and improved member of this latter class of device.

With modern day enhanced environmental awareness, portable air filtration devices to improve conditions of the ambient atmosphere in human environments have become popular. Many of these devices have provided mechanical filtration of one sort or another to remove particular material, but more importantly they also have provided means of removing various undesirable gaseous components generally by chemically reacting the unwanted gas to remove it, by chemically or physically modifying the gaseous compound in some fashion to make it less noxious, by diluting the amount of unwanted gas in any particular atmosphere by partial removal or reaction, and by similar processes, but most importantly by using some sort of a sorbefacient material to remove all or part of the unwanted gas. By far the most used of sorbefacient materials that have been developed for this purpose is particulated activated charcoal. This material not only provides an absorbent capability for many unwanted gases, but also provides secondary benefits in serving as a mechanical filter, depending somewhat upon its form, and also in entering into or inducing various chemical reactions as a catalyst, oxidant, or otherwise. The material may also be readily modified, both chemically and physically, to include or associate other catalytic or sorbefacient materials to further aid its activity.

In using sorbefacient materials, however, the precepts concerning mechanical filtration from the prior art have generally been followed, though they are not entirely or necessarily well applicable to the absorbent process. Mechanical filtration involves only the movement of a mass of air through a filtering membrane or mass of some sort and the filtration is accomplished by such air motion without much, if any, functional relationship to the time of gas passage, but rather substantially instantaneously. In an absorption process the reaction is somewhat different as this process requires a reaction between the air being operated upon and the absorbent material. The efficiency of the process, as in many chemical reactions, is functionally related to time of operative contact of the two materials. In general in the prior art, this time of contact of air with a sorbefacient material has not been well considered or dealt with, especially in the case of portable air filters.

In contradistinction my invention provides a relatively large mass of sorbefacient material so that there is a higher probability of longer contact between gaseous material passing over the sorbefacient material than there is with an historic lower mass of such material. I further provide a particular distribution of the sorbefacient material across an orifice through which air to be filtered passes. This distribution is of a lenticular configuration with its thinner portions at the periphery of an orifice, its thicker portions in the medial part of that orifice, and with the intermediate material graduated in thickness in a substantially uniform fashion between the extremes. This lenticular configuration of sorbefacient material provides thicknesses approximately inversely proportional to the volume of gas passing through given areas of the orifice, so that a higher volume of gas passes through a thicker portion of the filter and a lower volume of gas passes through a thinner portion of the filter. This configuration tends to equalize time of contact of gas with sorbefacient material to provide as great efficiency as may be obtainable with a given flow rate in a direct passage-type filter.

The physical configuration of my filter device is further adapted to maximize the absorption function of its filtration material. I provide an input orifice of substantial areal extent through which gas passes to be filtered. This may be efficiently accomplished in a single pass filter only by reason of the substantial amount of sorbefacient material used and the particular configuration of that material across the input orifice. The relative areal size of the input orifice is greater, by a multiplicative factor of two or three, than devices common in the prior art. My invention further provides a relatively large internal chamber into which filtered air is drawn. This tends to serve as an equalizing reservoir to cause airflow in a relatively uniform fashion over all portions of the input orifice, as opposed to prior art devices which have drawn gas through a relatively smaller area of filter material, often in a non-uniform fashion over all parts of that material. My plenum or chamber serves a further purpose of providing space where other sorbefacient type materials or chemical modifiers of the present day marketplace may be installed and maintained to further modify air filtered by my invention, especially as for additional removal or masking of odoriferous material.

The design of my filter is such that it may contain bulk quantities of activated charcoal, whereas prior art devices in general have either provided a filtration element in some type of container or cartridge that cannot be refilled by the ultimate user or have not allowed change of the filtration material at all. This feature of the instant device not only allows the use of less expensive bulk materials, but also allows changeability of filter materials as desired for particular filtration purposes. In the present day filtration arts, particulated activated charcoal is often filled or otherwise associated with various materials and substances that aid in the selective removal of particular gaseous components of the atmosphere and these materials may be quite readily used with my invention. In fact with the use of such latter materials, and the modern day knowledge of their particular gases, a whole spectrum of undesired gases may be selectively removed from the ambient atmosphere.

The reservoir-like chamber of my device also allows a flow of substantial volumes of air through a larger filter without disrupting its absorbent process. Since the filter is adapted for use as a portable unit, and commonly operates upon air in a reasonably enclosed space, such as a room or the like, this increased airflow in such space allows more rapid filtration of the enclosed air volume over a given period of time than might be accomplished with prior art devices not allowing such a large airflow. My device is therefore admirably adapted to larger volume commercial situations as well as ordinary home usage.

My invention resides not in any one of these particular features per se, but rather in the synergistic combination of all of its structures that give rise to the functions necessarily flowing therefrom, as hereinafter further specified and claimed.

SUMMARY OF INVENTION

My invention generally provides a peripheral container defining an internal chamber communicating from a relatively larger horizontally orientated input orifice carrying a filter member to a relatively smaller vertically orientated output orifice, with a fan member carried within the chamber to move air therethrough.

The filter member comprises two spacedly opposed screen elements defining therebetween a lenticular containment space with a thinner peripheral portion gradating to a thicker medial portion. One screen element is releasably positioned to allow removal for access and placement of particulated charcoal filtration material in the containment space defined partially thereby. The filter element has associated structure that allows positioning of a secondary mechanical filtration element on the input side of the sorbefacient material, if desired.

The internal chamber defined in the peripheral container carries a fan element that moves air from within the chamber, after its passage through the filtration element, outwardly through the smaller output orifice. The entire unit is self-contained and portable, except for its required interconnection with an electrical power source for fan operation.

In creating such a filtration device, it is:

A principal object of my invention to provide a portable self-contained absorption type filter device for purification of the atmosphere within somewhat enclosed spaces, such as ordinary rooms of a structure that has a lenticularly shaped filter with thinner peripheral portions graduating to thicker medial portions to maintain substantially uniform time of contact of the filter material with air moving through any particular area of the filter.

A further object of my invention to provide such a filter device that has at least one releasably positionable defining surface so that bulk particulate sorbefacient material may be used and accessed in the filter by a user without requirement of any pre-packaging or containment of such material.

A further object of my invention to provide such a filter device having a peripheral container defining a larger horizontal input orifice carrying the filter element and smaller vertical output orifice with air being moved through the filter and into a reservoir-like space in the container by a squirrel cage fan, which tends to cause air to move through all portions of the filter element.

A still further object of my invention to provide such a filter device that provides substantially more reaction time of air upon the filter material because of the thickness of the filter and the substantial volume of sorbefacient material contained therein.

A still further object of my invention to provide such a filter device that may have a selectively associated mechanical filter positioned on the input side of the absorption filter if desired.

A still further object of my invention to provide such a filtration device that is self-contained, except for interconnection with an electrical supply system for powering.

A still further object of my invention to provide such a filtration device that is of new and novel design, of rugged and durable nature, of simple and economic manufacture and otherwise well suited to the uses and purposes for which it is intended.

Other and further objects of my invention will appear from the following specification and accompanying drawings which form a part hereof. In carrying out the objects of my invention, however, it is to be understood that its essential features are susceptible of change in design and structural arrangement with only one preferred and practical embodiment being illustrated in the accompanying drawings, as is required.

BRIEF DESCRIPTION OF DRAWINGS

In the accompanying drawings which form a part hereof and wherein like numbers of reference refer to similar parts throughout:

FIG. 1 is an isometric surface view of my invention showing various of its parts, their configuration and relationship.

FIG. 2 is a vertical orthographic cross-sectional view of the device of FIG. 1, taken on the line 2—2 thereon in the direction indicated by the arrows to show further internal structure.

DESCRIPTION OF THE PREFERRED EMBODIMENT

My invention generally provides peripheral container 10 defining an internal chamber with a larger horizontal input orifice carrying filtration member 11 and a smaller vertical output orifice through which air is exhausted by fan member 12 carried in the internal chamber.

Container 10 is a generally rectilinear structure with rounded corners, somewhat in the form of an open top box having bottom 13, similar ends 14, front 15 and back 16. Top rim 17 is defined at the uppermost edges of the ends and front and back to provide extra strength and rigidity, especially when the structure be formed of polymeric materials. Output orifice 18 is defined in the medial portion of front 15 and is covered on its exterior surface by screen element 19 carried in peripheral frame 20 which is configured to fit about the periphery of the output orifice. The lower lateral portion of the back defines orifice 21, peripherally reinforced by grommet 22, for passage of an electrical supply cord 39 to power the fan member carried within the container. This peripheral container structure described defines an open top chamber 23 within container 10.

Container 10 may be formed from most reasonably rigid durable materials, but the common material of preference is one of the harder more dense polymeric plastics, either foamed or unfoamed, or a composite of laminae of plastic materials and metal sheet.

Filter member 11 provides lower containing screen 24 configured in a curvilinear fashion to define a depending cavity of lenticular shape, thicker in its medial portions and thinner in its peripheral portions with substantially uniform gradation therebetween. The periphery of lower screen 24 defines planar lip 25 configured to fit upwardly adjacent the upper surface of top rim 17 of the peripheral container, as illustrated particularly in FIG. 2. The configuration of this lower screen element is critical to my invention and must be of the essential shape described for the screen element to fulfill its purpose. The exact shape is not so critical as its essence and the details of curvature and absolute cavity depth may vary somewhat depending especially upon the parameters of the orifice structure in the screen, the nature of particulate material forming in the filter, and the volume of airflow through the orifice which the filter element covers. In general, the shape of the lower screen will be somewhat of a circular arc in both perpendicular to the parallel peripheral elements, directions with smooth transitions between these sections at their intersections. The volume defined by the indentation in this screen element should be such as to contain approximately ten pounds of medially sized (0.125 inch screen) particulated activated charcoal in an area having peripheral dimensions of approximately 16 by 24 inches.

The lower screen element must be formed of some material of sufficient rigidity to maintain its shape against deformative forces placed upon it. I prefer a stainless steel screen for this purpose, though undoubtedly screens formed of other rigid materials, and especially the more dense polymeric plastics, might serve the purpose of my device, if not so well. The nature of the holes or orifice structure defined by the screen is not critical, but obviously must be small enough to prevent the passage of particulate sorbefacient material to be used with the filter and this commonly requires a mesh size of major dimension not more than approximately 0.06 inch. To provide proper airflow through the screen, the orifices defined in it should have a cumulative area of at least 75 percent of the area of the screen. The shape of the orifices is not critical, but most commonly by reason of the exigencies of manufacture a woven mesh-type screen will have relatively rectilinear orifices and a sheet-type screen will have generally round orifices. Both configurations of orifices have been found operative.

Upper screen element 26 is of a generally planar configuration, though if necessary to define an appropriate containment chamber for a particular mass of particulate filter material, it may be of a curvilinear shape extending either inwardly or outwardly relative to container 10 as required. Generally, the nature of the orifices in the upper screen element will be substantially similar to those specified for the lower screen and the upper screen peripheral shape will be substantially the same as that of the lower screen.

The upper screen element 26 is carried in peripheral frame 27, somewhat larger than top rim 17 of the container 10, so that the peripheral frame may define lower container groove 28 to fit in frictional engagement over the vertical sides of top rim 17 of the peripheral container. Upper screen lip 29 is defined in the upper portion of frame 27 to accept and fastenably receive the peripheral portion of the upper screen therein. Preferably this peripheral frame 27 has sufficient vertical extent that it defines a medial space 30, between grooves 29 and 28, wherein a mechanical filter 40 may be placed, if desired, for use with my invention. Peripheral frame 27 is formed of some rigid, reasonably durable material, generally of the same nature as that from which container 10 is formed.

The filter structures are maintained in releasable assemblage with container 10 by means of stud 31 extending from support in the upper portion of chamber 23 through both upper and lower screen elements and fastenably engaged above the upper screen element by wing nut 32. The lower portion of this stud, in the instance illustrated, is fastenably carried by fan housing bracket 36 supported in the upper medial portion of chamber 23 by the peripheral container. The bracket is fastened to container 10 by fasteners 37 extending therebetween. Preferably the structures are configured so that these fasteners 37 extend not only through the container front, defining the periphery of orifice 18, but also through peripheral frame 20 of the output orifice screen element to provide additional strength and rigidity for the entire structure. This feature is particularly desirable if container 10 be formed of a material such as a polymeric plastic having lower strength and rigidity as it tends to distribute forces on the container over a substantial area. Mechanical fasteners 37 illustrated are of a rivet type, though other similar types of mechanical fasteners are readily usable to accomplish this purpose.

The space or chamber defined between upper and lower screen elements 26, 24 is filled with a particulated sorbefacient material 33. The material of preference is activated charcoal, though undoubtedly other materials of a similar nature that might be conformed within the space defined between the screen elements might be usable with my invention. Activated charcoal is preferred because of its ready availability and historicity of use as heretofore established in the absorptive filtration arts. This material may also embody additives of various sorts, as heretofore known, to aid in the selective removal, by filtration reaction or otherwise, of particular materials and the charcoal again is desirable by reason of this function. The charcoal material itself is not an essential part of my invention, per se, however, and various other sorbefacient materials containable between screens 24 and 26 may be used with my invention. It is to be particularly noted in relation to containment of this material, however, that the material is contained in a bulk mass between the two filter screen elements and requires no other containerization, such as secondary membranes, cartridge structures or the like.

Fan member 12 is carried within chamber 23 defined by container 10. This member provides motor 34 driving squirrel cage fan 35 to force air within chamber 23 outwardly through output orifice 18 defined in the peripheral container. In the instance illustrated, squirrel cage fan 35 is journaled for motion about a vertical axis, though its orientation is not critical to my invention so long as it performs its air moving function. The fan member receives air from chamber 23 and moves that air to output orifice 18 communicating therewith. The fan is mounted on the inner surface of front side 15 of the peripheral container by mechanical fastening to housing bracket 36.

Fan housing 41 partially encloses fan 35 to allow input from internal chamber 23 of container 10 and direct output through orifice 18. Motor 34 of the fan mechanism is preferably activated electrically by power supplied through cord 39 which passes outwardly through cord hole 21 in container 10 to an external source of electric power. The type of fan member and its powering are not critical to my invention, but merely constitute a necessary part of it to make it operative. Motors driven by other than electrical power and fan types other than squirrel cage may be used with appropriate modification of design to accomplish the functions specified.

The fan structure must be sufficient to provide a reasonably high volume airflow of approximately 475 cubic feet per minute for a filter of the preferred rectilinear peripheral dimensions indicated of approximately 16×24 inches. In general, fan powering by means other than electricity is not particularly feasible, as other readily available powering means well may create more pollution of the ambient atmosphere about the filter device than the device itself removes from that atmosphere.

Having thusly described the structure of my invention, its operation may be understood.

Firstly, an air filter is constructed according to the foregoing specification. The filter element is opened by removing wing nut 32 from fastening stud 31 and then removing the upper filter screen to gain access to the chamber defined between the filter screens. This chamber is then filled with appropriate particulated sorbefacient filter material, such as activated charcoal, and the upper surface of the particulate mass manually configured to conform substantially with the plane through the rim of that element. The upper filter screen is then repositioned over the lower filter screen, wing nut 32 fastened on stud 31, and the device is ready for operation. The filter device is positioned in a somewhat confined space wherein filtration is desired and connected to an ordinary household electrical current for powering of fan member 12. The operation of the device is then substantially automatic.

As the fan operates, air is moved from exteriorly of the top of the filter device through filter member 11 in the input orifice of the peripheral container and into internal chamber 23 defined in that container. This air motion is caused by squirrel cage fan 35 exhausting air from the chamber 23 to cause that air to move outwardly through output orifice 18 defined in front 15 of the peripheral container. Since the ambient atmosphere on both sides of the container orifices is at the same pressure, air will be forced through the upper input orifice through filter member 11 by reason of the air forced out of the output orifice, since a vacuum cannot exist in chamber 23 because of its openings to the ambient atmosphere. An airflow will thusly be established through my filter device, with air entering through the filter member and being exhausted from container 10 through output orifice 18.

As this process continues, the incoming air will move over particulate filter material 23 and be acted upon by that material during its passage therethrough. The particulated sorbefacient material, especially if activated charcoal, provides a large surface area in proportion to its volume, and this surface operates to remove various gaseous components from the ambient atmosphere in one fashion or another as heretofore known, probably principally by absorption. The particulate sorbefacient material also will tend to serve as a mechanical filter, depending upon the degree of compaction of and the size of that material and similar parameters. The material, if charcoal, may be activated, chemically or physically, with various agents and by various means heretofore known in the filtration arts for such purposes, to selectively absorb particular gaseous contaminants. It is to be noted that the particulate filtration material may be readily changed from one type to another as desired. Since the particulate filtration material is contained in bulk, various types of it may be admixed and spent material may be regenerated and reused, if desired.

It is further to be noted that an ordinary mechanical filtration element 40 of a general planar form and peripheral configuration adapted to fit within space 30 defined by the peripheral frame 27 of the upper filter screen may be used, if desired. Such mechanical filter may provide any of the various filter functions heretofore known for filtration of particulate matter from air, including various coatings, electrostatic forces causing particle adhesion, and the like. The action of such a mechanical filter will be substantially the same with my invention as it would be in other environments.

It is to be particularly noted in considering my filter, that if air flows through a reasonably homogeneous prior filter, that airflow in the medial portion of such filter is greater than about the periphery. This tendency of airflow would exist in my invention were the filter member of uniform thickness, but with my filter's functional configuration that is related to the volume of airflow through particular portions of it, there is provided greater resistance and denser filtration material in the areas which potentially carry higher airflow volumes to, by this means, provide substantially the same filtration benefits, or more properly the same time of contact of transient air with sorbefacient materials, as if the airflow were uniformly distributed over the entire surface of the filter. With normal airflows created by structure of the size and configuration specified, the airflow is uniformly distributed over the various areas of the filter, whereas with an ordinary uniformly thick filter this is not generally the case.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent, and

What I claim is:

1. A portable air filtration device comprising, in combination:

a rigid five-sided peripheral container defining an internal chamber and having larger horizontally orientated upper input orifice and a smaller vertically orientated output orifice;

a filter member, carried in the input orifice, having a first filter screen of a lenticular shape with an outwardly extending planar rim for support in the input orifice of the peripheral container and a second cooperating substantially planar filter screen having a peripheral rim adjacent the rim of the first filter screen to define a lenticular chamber between said first and second screens, said chamber being of size sufficient to contain at least ten pounds of particulated charcoal, each said filter screen defining an area of at least approximately 384 square inches with defined orifices comprising at least seventy-five percent of said area and no orifice having a major dimension greater than about 0.06 inch, and releasable means for mechanically fastening the first filter screen with its rim in adjacency to the rim of the second filter screen in the aforesaid input orifice;

particulate activated charcoal, having a particle size larger than the orifices defined in the screen elements, carried in the chamber defined between said first and second filter screens in a lenticularly shaped mass to cause substantially uniform air flow through all portions of said charcoal mass; and a fan member carried within the internal chamber defined by the peripheral container to receive air from the internal chamber and force that air at a rate of at least about 465 cubic feet per minute through the output orifice defined in said container to create a flow of air from about the peripheral container through the filter member in the input orifice and out of the output orifice defined in the peripheral container.

* * * * *